Oct. 7, 1969     S. A. BARTFAY     3,470,736
OCULAR TONOMETER
Filed April 27, 1967     2 Sheets-Sheet 2
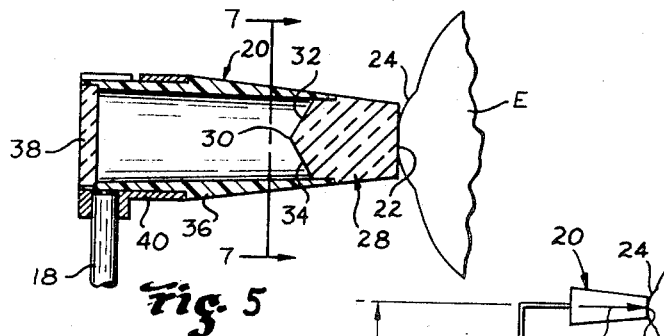
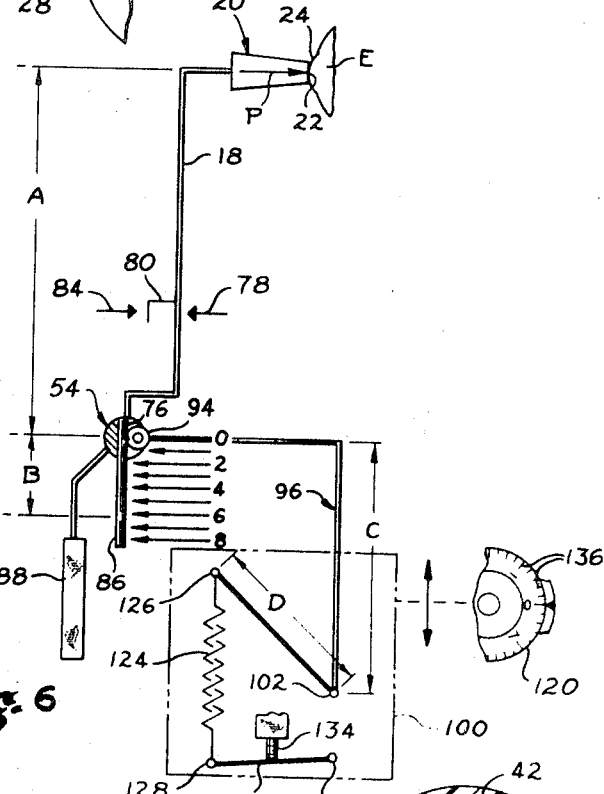
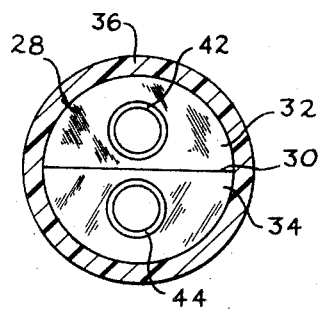
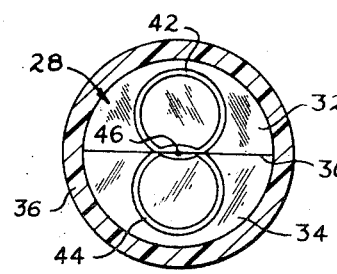
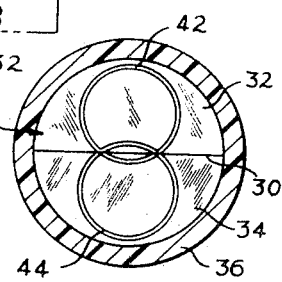
INVENTOR.
STEPHEN A. BARTFAY
BY
ATTORNEY 3,470,736
OCULAR TONOMETER
Stephen A. Bartfay, Williamsville, N.Y., assignor to American Optical Company, Southbridge, Mass., a corporation of Delaware
Filed Apr. 27, 1967, Ser. No. 634,279
Int. Cl. A61b 9/00
U.S. Cl. 73—80                                                                      4 Claims

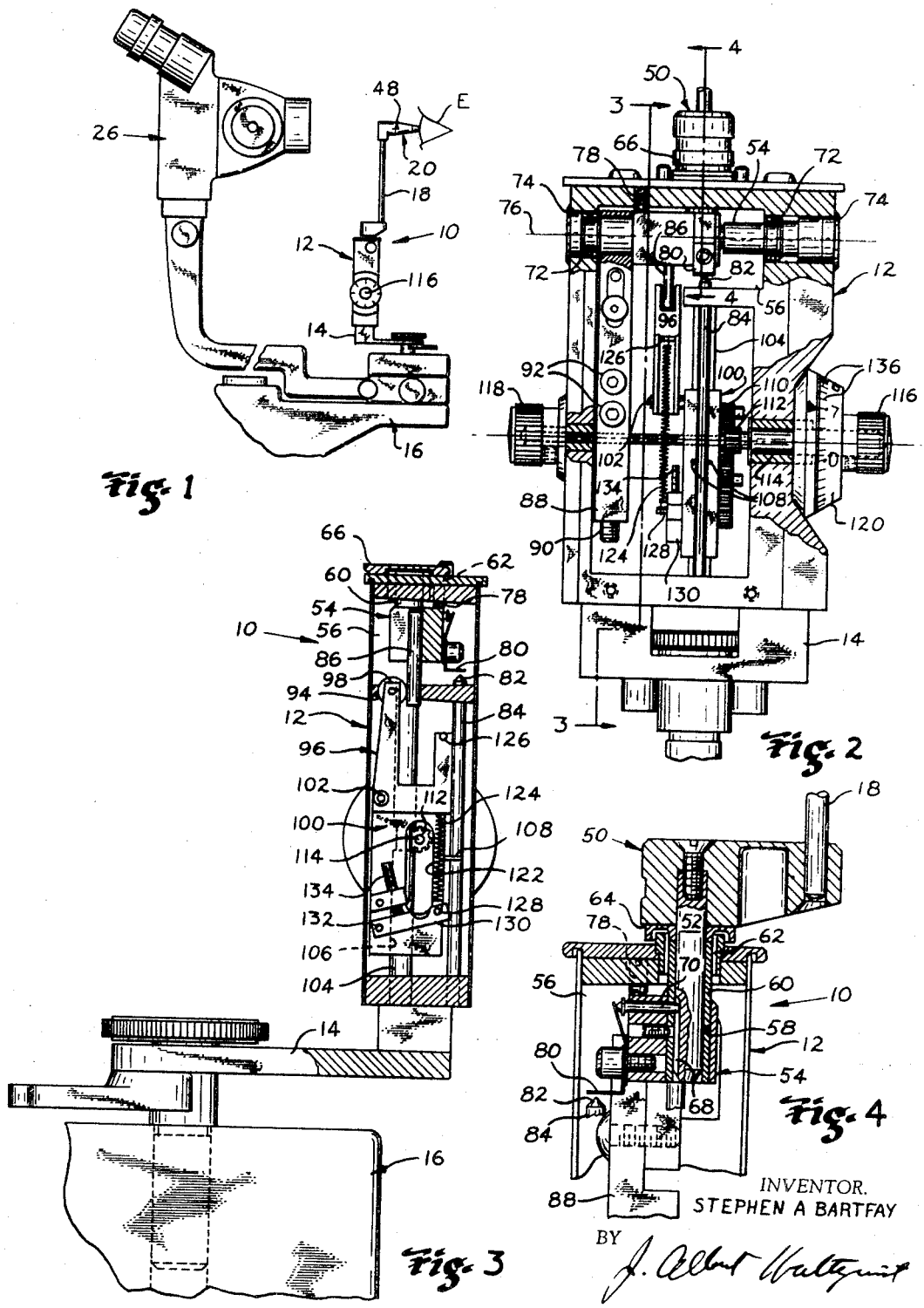

ABSTRACT OF THE DISCLOSURE

An instrument for measursing the tonometric or intraocular pressure of an eye by applanation of its cornea. A trunnioned work arm in perfect pivotal balance carrying an eye applanating head is provided with an operating lever having a force transfer point continuously adjustable along its length. A constant force of known energy stored in a spring is applied to the transfer point. When the force transfer point is adjusted along the lever to a position where the applanating head flattens the cornea to a given diameter, a linear measure of the effective length of the lever required to achieve such applanation is provided. This measure is read in terms of intraocular pressure.

BACKGROUND OF THE INVENTION

Field of the invention

Instrumental ocular tonometry with particular reference to improvements in apparatus for measuring the tonometric or intraocular pressure of an eye by applanation of its cornea.

Description of the prior art

In the field of instrumental ocular tonometry, devices for determining the tonometric or intraocular pressure of an eye have included the impression type and the applanation type. The former, which creates tension forces in the ocular wall acting against the tonometer, is currently considered as being less desirable than the latter wherein ocular tension forces may, for all practical purposes, be disregarded in that they oppose each other in the plane of applanation.

However, in instrumental applanation tonometry, even the most sophisticated forms of prior art tonometers such as, for example, the weight operated instrumentation disclosed in U.S. Patent No. 3,070,997 are considerably lacking in many respects. That is, in being weight operated and influenced by the force of gravity such instruments are inherently highly sensitive to attitude and it is a repressing requirement that they be precisely aligned in their holding fixtures prior to and continuously during use. This attitude sensitivity, accordingly, also extends to the holding fixtures themselves (i.e. instrument stands and the like) in that they too must be capable of continually maintaining their own initial attitude in order to sustain that of the instrument supported thereby under ordinary conditions of use and inadvertent abuse of both.

Furthermore, the highly complex and generally inordinate mechanical movements employed in current forms of weight operated tonometric instrumentations are subject to error factors of lost motion and friction which vary with the attitude of the instrument and are difficult to detect and account or compensate for in the final readings of intraocular pressure. In this regard, previously known ocular pressure applying and measuring linkages used in modern tonometers are overburdened with complexity and, accordingly, under the most favorable conditions of mechanical perfection and alignment they are subject to unaccountable disturbances in their action.

With the aforementioned drawbacks of the prior art and others which may become apparent hereinafter being borne in mind, it will be appreciated from the following description that the present inventive concept has been directed principally toward simplification of apparatus and procedure used to effect applanation tonometry and that particular emphasis has been placed upon the elimination of attitude sensitivity of the apparatus. The latter being a key factor in simplification of the procedure used in performing tonometry is also a major factor in accomplishing exceptional simplification of structure and, accordingly, minification, or substantially complete nullification of lost motion, frictional and other artifactual disturbances in its operation. Thus, the present invention accomplishes greater accuracy and reliability in duplication of ocular tonometric measurements with increased simplicity and ease of implementation.

SUMMARY OF THE INVENTION

The present inventive concept operates on the principle of determining, in terms of intraocular pressure, the amount of resistance or opposing force offered by an eye to a given amount of applanation of its cornea by balancing said opposing force with a known constant force of energy stored in the instrument.

This is accomplished through the provision of a main instrument body having a perfectly balanced work arm anti-frictionally trunnioned therein. The work arm includes an operating lever extending from the axis of its trunnion and carries a transparent eye applanating head at its opposite free end through which the extent of applanation of the eye may be observed when the applanating head is impressed thereagainst by actuation of the operating lever.

The operating lever is provided with a force transfer point which is antifrictionally adjustable along its length in a direction toward and away from the trunnion axis. To this transfer point, the constant force of stored energy is continually applied so as to actuate the operating lever and pivot the work arm toward the eye. With the force transfer point disposed at zero distance from the trunnion axis, the perfectly pivotally balanced work arm will exert no pressure against the eye. However, as the force transfer point is moved along the operating lever away from the trunnion axis, its distance therefrom affords a direct linear measure of force or pressure applied to the eye. This force actually being a measure of the opposing force or resistance of the eye to applanation is, accordingly, read as tonometric or intraocular pressure.

A standard is established wherein, for a given diameter of applanation of the eye observed through the applanting head, a balance of the constant force (pressure) of stored energy will be reached at a known distance along the operating lever from the zero point or axis of the work arm trunnion. Thus, with the work arm being in perfect balance in the absence of pressure applied thereto, the pressure actually applied to the eye is equal to the applied force of stored energy times the ratio of the length of the work arm from its trunnion to the known distance along the lever. This, of course, is a measure of the intraocular pressure of the eye which, under the aforesaid conditions, is opposing the force of the work arm with equal and opposite pressure.

By reason of the fact that the work arm is, per se, perfectly balanced and its actuating force is embodied in a self-contained storage fixture within the apparatus which will be described in detail hereinafter, the present instrumentation is insensitive to the force of gravity and is operable with equal facility and accuracy at any and all preselected attitudes, e.g. with the patient in either a supine, upright or inclined position.

The present inventive concept will be more fully understood by reference to both the accompanying drawing and the following detailed description of an actual embodiment of the invention.

DESCRIPTION OF THE DRAWING

FIG. 1 illustrates, in side elevation, an embodiment of the present invention;

FIG. 2 is a partially cross-sectioned rear view of the improved tonometer of the invention with the rear cover removed showing the inner mechanism thereof;

FIG. 3 is a cross-sectional view taken generally along line 3—3 of FIG. 2 but with the aforesaid cover plate included;

FIG. 4 is an enlarged fragmentary cross-sectional view taken generally along line 4—4 of FIG. 2;

FIG. 5 is an enlarged cross-sectional view of an eye applanating component of the tonometer;

FIG. 6 is a schematic illustration of principal parts of the tonometer mechanism;

FIG. 7 is an enlarged cross-sectional view taken along line 7—7 of FIG. 5 showing images produced by the component illustrated in FIG. 5 at one stage of applanation of an eye therewith; and FIGS. 8 and 9 are views similar to FIG. 7 each illustrating images resulting from other stages of eye applanation.

DESCRIPTION OF THE PREFERRED EMBODIMENT

In FIG. 1 there is shown in side elevation, a presently preferred embodiment of the invention hereinafter referred to as tonometer 10.

In this illustration of its external appearance, tonometer 10 can be seen to comprise main body 12 carried by a right-angularly disposed supporting bracket 14 used to affix the tonometer to an instrument stand or the like such as, for example, stand 16.

Extending vertically from body 12 in offset relationship therewith is work arm 18 having applanating head 20 at its free end. Head 20 has a transparent flat applanating surface 22 (see FIG. 5) which, when tonometer 10 is in use, is pressed against the cornea 24 of a patient's eye E which, in recognized fashion, is superficially anesthetized, treated with a fluorescein solution and illuminated.

Surface 22 flattens the cornea of the eye to an extent determined by the pressure applied thereto causing the fluorescein solution to form a dense readily discernable ring about the flattened or applanated area. This ring can be viewed through head 20 particularly with the aid of a microscope 26 or an equivalent viewing device and it is used to visually determine the extent or diametral size of corneal applanation.

In this form of instrumental tonometry it is customary to applanate the cornea of the eye to a given diametral size during each pressure measuring operation and to use this as a standard relative to which the pressure applying mechanism in the instrument is calibrated in terms of pressure, e.g. millimeters of mercury.

To this end, the present invention incorporates in its applanating head 20 an improved form of prism 28 formed of glass or plastic (see FIG. 5) by means of which arrival at the aforesaid standard of applanation diameter may be instantly visually detected. Prism 28, having flat applanating surface 22, is provided with an oppositely disposed roof-shaped image receiving end 30 having prism surfaces 32 and 34. End 30 of prism 28 is sealed within the hollow interior of supporting tube 36 by window 38 of glass or plastic through which it may be viewed. Tube 36 is rotatably friction-fitted in supporting sleeve 40 which is fixed to arm 18 so that the roof line of prism surfaces 32 and 34 may be oriented in any desired direction simply by rotation of tube 26 in sleeve 40.

When the applanating surface 22 of prism 28 is pressed against cornea 24 of eye E with a gradually increasing force the diametral size of flattening of the cornea is correspondingly increased and displayed on end 30 of prism 28 as shown in FIGS. 7, 8 and 9.

In FIGS. 7, 8 and 9, rings 42 and 44 are duplicate images formed by refraction in prism 28 of the aforementioned one ring which outlines the flattened area on applanating surface 22. This ring is produced by accumulation of the fluorescein solution and/or lachrymal fluid on the eye around the flattened area thereof. Upon initial contact of surface 22 with the cornea, rings 42 and 44 will each appear simply as a dot. As flattening begins, however, they will assume the illustrated ring-like configurations which enlarge as the pressure is increased to the extent where inner diameters thereof intersect at point 46 (FIG. 8) and beyond that, to a stage of overlapping relationship such as is shown in FIG. 9.

In the present arrangement, the condition shown in FIG. 8 is used as the aforesaid standard of applanation diameter for measuring intraocular pressure with tonometer 10. It may be arrived at merely by terminating the gradual increase in pressure against the eye when, as viewed through window 38, rings 42 and 44 appear as shown in FIG. 8. Alternatively, the pressure applied to cornea 24 may be brought to a point where rings 42 and 44 overlap substantially as shown in FIG. 9 whereupon, by gradual reduction in pressure applied to the cornea, the standard applanation diameter (FIG. 8) may be arrived at.

In working with eyes which have been determined to have cylinder error, i.e. astigmatism, compensation for such may be made, if desired, by rotationally orienting tube 36 in sleeve 40 an amount sufficient to align the roof line of prism surfaces 32 and 34 with the known angle of cylinder axis of the eye. Indicia 48 (see FIG. 1) on tube 36 are provided for this purpose. In all cases, however, the roof line of prism surfaces 32 and 34 is placed in the plane of a line intersecting the apex of cornea 24 with surface 22 disposed tangentially to said apex when the eye is viewed binocularly and is angled slightly to the right or left when viewed monocularly with one's right or left eye respectively. This may be accomplished by adjusting the position of the patient's head or the tonometer 10 one vertically relative to the other for centering with the cornea and rotating the tonometer in its stand the amount required for right or left eye (monocular) viewing.

Details of operation mechanism

While tonometer 10 may be operated at any attitude, i.e. disposed horizontally or at any desired inclination so that patients may be tested for glaucoma in supine or reclining positions, it is, for purposes of illustration only, shown in an upright position wherein the patient would, accordingly, be sitting upright with applanating surface 22 disposed substantially tangentially to the apex of the cornea of his eye.

Work arm 18, being detachable from body 12 of tonometer 10 is provided with adaptor 50 at its proximal end which, in turn, has depending anchor pin 52, see FIG. 4.

Anchor pin 52 is detachably received in trunnion 54 which, as shown in FIG. 2, extends transversely across the hollow interior 56 of body 12 adjacent its uppermost end. Bore 58 (FIG. 4) in trunnion 54 is provided with bushing 60. Bushing 60 extends upwardly through opening 62 in body 12 and receives anchor pin 52.

With adaptor 50 seated upon the uppermost end of bushing 60, dust protector 64 carried by adaptor 50 extends over opening 62. When work arm 18 including adaptor 50 is removed from main body 12, dust cap 66 (FIGS. 2 and 3) may be swung into covering relationship with opening 62 to prevent foreign matter from entering the interior of main body 12 during periods when the tonometer is not in use.

In FIG. 4 it can be seen that anchor pin 52 has a longitudinal slot 68 into which detent 70 is spring biased. Thus, work arm 18 may be easily pivoted in bushing 60 against the resistance of detent 70 for swinging head 20 away from the eye at times when it is desired to view the eye directly for routine biomicroscopy. Detent 70 will, however, locate and resiliently lock head 20 in place when it is in its normal forwardly directed position of use. The action of detent 70 snapping into slot 68 can be felt by the practitioner assuring him of proper orientation of arm 18 for patient testing therewith.

Referring more particularly to FIG. 2, it can be seen that trunnion 54 is journaled in main body 12 with antifriction bearings 72 each protected by a dust cap 74.

When fully inserted into bushing 60 (FIG. 4) work arm 18 is, accordingly, adapted to pivot toward and away from eye E about axis 76 of trunnion 54 within limits. A fixed stop consisting of screw 78 limits the extent of pivoting of head 20 toward the eye and a resilient stop consisting of flat spring 80 (FIGS. 2, 3 and 4) adapted to engage pointed end 82 of upright rod 84 limits the extent of pivoting of head 20 away from the eye. The latter aids in preventing injury of the eye in the event that head 20 should, during alignment or use of the tonometer be accidentally moved too close to the eye or vice versa.

Controlled pivotal movement of work arm 18 is effected by operating lever 86 (FIG. 3) which depends from trunnion 54 to which it is fixed. The combined structure of work arm 18, head 20, trunnion 54 and lever 86 is, in the absence of any force being applied to the latter, perfectly pivotally balanced relative to axis 76 by counterweight 88 (FIGS. 2 and 4). Extreme precision in achieving the perfectly balanced condition of the aforesaid structural combination is attainable in a ready recognizable manner through the provision of adjustable balancing screws 90 and 92 threaded into counterweight 88. Screw 90 and screws 92 being respectively threadedly advanceable or retractable in directions normal to each other are adjusted to the point where the balanced condition is achieved for vertical, horizontal and, consequently, all other attitudes of the instrument.

Lever 86 is of circular cross-section and the aforementioned antifrictional force transfer point thereon is formed by roller 94 (FIG. 3) carried by bell crank 96 at one end 98 thereof. Roller 94 thus makes antifrictional point contact with the round side of lever 86. This point of contact follows a line along the length of the lever when bell crank 96 is raised and lowered in body 12 as follows:

Bell crank 96 is carried by fixture 100 (FIGS. 2 and 3) to which it is pivotally connected by pintle 102. Fixture 100, in turn, is carried by a slideway which, in the present embodiment of the invention, is in the form of a vertically disposed rod 104 (FIGS. 2 and 3). Rod 104 is secured at its opposite ends within the supporting structure of body 12. Longitudinal bore 106 (FIG. 3) in fixture 100 receives rod 104 with a precision sliding fit and guide pins 108 (FIGS. 2 and 3) extending laterally from fixture 100 straddle rod 84 to prevent rotational disorientation of the fixture during sliding movement thereof along rod 104. Rack 110 on fixture 100 and pinion 112 (FIG. 2) on operating shaft 114 are employed to effect the aforesaid sliding movement of fixture 100 and, consequently, adjustment of the force transfer point along lever 86. This point is established by roller 94 as already mentioned. Shaft 114 (FIGS. 2 and 3) is journaled for rotation about its axis in main body 12 with its opposite ends extending externally thereof. Either of knobs 116 and 118 attached to shaft 114, externally of main body 12, may be used at the practitioner's discretion to operate shaft 114. Slot 122 (FIG. 3) in fixture 100 permits sliding movement of the fixture to take place without interference from shaft 114 which extends therethrough.

The aforementioned constant force of known stored energy which is applied to the force transfer point on lever 86 is provided by helical tension spring 124 (FIGS. 2 and 3). One end of spring 124 is attached to end 126 of bell crank 96 and its opposite end is fastened to one end 128 of adjusting arm 130 on fixture 100. Being pivoted to fixture 100 adjacent its opposite end 132, arm 130 is adjustably pivoted by screw 134 to the point where spring 124, through the mechanical advantage of the effective lever arm of bell crank 96 applies a predetermined desired force or pressure against lever 86. Thus the constant force of energy applied to lever 86 is stored in fixture 100.

Due to the considerable mechanical advantage in leverage which is achieved through bell crank 96, only a slight tensioning of spring 124 is required to apply a desired relatively large force against lever 86. Consequently, fatigue of spring 124 rarely if ever occurs during the expected useful life of tonometer 10. However, in the event of such, simple adjustment of screw 134 and/or replacement of spring 124 may be effected to rectify same.

Operation of the instrument

For a clearer understanding of the principles of operation of the above-described instrumentation, reference is now made to a schematic representation thereof wherein corresponding parts of FIGS. 1–5 are designated by like reference numerals.

In FIG. 6 it can be seen that the applanating force or pressure P applied to eye E is:

$$P = P_s \left(\frac{D}{C}\right)\left(\frac{B}{A}\right)$$

where;

$P_s$ = the tensional force of spring 124
$D$ = the length of lever arm from end 126 of bracket 96 to pintle 102
$C$ = the length of lever arm from end 98 of bracket 96 to pintle 102
$A$ = the length of work arm 18
$B$ = the variable length of lever arm of lever 86 depending upon the position of roller 94 therealong.

From the foregoing description of FIGS. 1–5, it can be seen that all factors to the right of the equality signs of the relationship $$P = P_s \left(\frac{D}{C}\right)\left(\frac{B}{A}\right)$$

are mechanically fixed and remain constant with the exception of B which is the only variable quantity. Accordingly, with work arm 18 in perfect balance on trunnion 54 (its fulcrum), P is a linear function of B.

With roller 94 at the illustrated position of alignment with the axis of trunnion 54 (FIG. 6), pressure P against eye E is zero. As roller 94 is moved along lever 86 to points 2 through 8 (FIG. 6) by actuation of fixture 100, the pressure applied to eye E is increased linearly as the distance along lever 86 (its lever arm) is increased. Thus, through the gearing ratio selected for rack 110 and pinion 112 (FIG. 2) dial 120 is indexed with indicia 136 reading from 0 to 8 in terms of millimeters of mercury. In the presently preferred arrangement, each numbered mark on dial 120 represents a multiple of 10 mm. Hg of pressure. This calibration is established straightforwardly from the laws of physics wherein pressure P equals the constant force applied by roller 94 times the ratio of the length A of work arm 18 to the length B (which is variable) of the effective lever arm of lever 86.

Upon applanation of eye E to the aforementioned standard diameter in the manner already described, the equal and opposite intraocular pressure of eye E opposing pressure P may be read directly upon dial 120.

The standard applanation diameter may, for example equal 3.06 millimeters, i.e. have a surface area of 7.35 mm.$^2$. This, as it is known in the art, is within the range of sizes of applanation wherein falsifying effects of cornea rigidity and adhesion between the applanating surface 22 and the eye substantially, if not entirely, neutralize each other. Accordingly, angle α of prism surfaces 32 and 34 (FIG. 5) is controlled to be such that rings 42 and 44 (FIGS. 7, 8 and 9) will appear as in FIG. 8 when the applanation diameter reaches the aforesaid exemplary standard diametral size. Other angles α may be used for establishing standard applanation diameters of other sizes.

In summary it is pointed out that the present inventive concept provides the advantages of:

(1) A uniquely simple and inexpensive highly accurate eye applanating and applanation size determining means (head 20);

(2) A perfectly balanced work arm and its associated mechanism (arm 18 and lever 86) permitting operation of tonometer 10 at any desired attitude without adverse affect upon its accuracy of measuring intraocular pressure;

(3) A self-contained energy storage device (fixture 100, bell crank 96 and spring 124) for applying an operating force to the work arm which is constant regardless of the point of application thereof to the work arm lever and/or attitude of the instrument; and (4) General or overall mechanical and operational simplification of instrumentation.

I claim:

1. A tonometer for measuring the intraocular pressure of an eye by applanation of its cornea comprising:
   a main instrument body;
   a trunnion journaled for rotation about its axis in said body;
   a work arm extending from said trunnion and having a free end disposed externally of said body;
   an eye applanating head at said free end of said work arm, said head having a flat one end for applanating cornea when positioned and forced under pressure thereagainst;
   means pivotally balancing said work arm relative to said trunnion axis at all attitudes of said instrument body;
   a lever operable under pressure applied thereto for forcing rotation of said trunnion and corresponding movement of said free end of said work arm and applanating head toward said cornea; and
   constant pressure energy storage means in said instrument body including means for applying energy of constant pressure to a transfer point on said lever, said energy storage means being carried by a slideway in said instrument body and including a main supporting fixture slidably fitted to said slideway, a bell crank pivotally connected intermediately of its opposite ends to said fixture, a roller at one end of said bell crank establishing said pressure transfer point on said lever by making contact therewith and a constantly tensioned spring having one of its ends attached to said fixture and its opposite end attached to the other end of said bell crank whereby, energy supplied by tension in said spring is applied through said bell crank to said transfer point on said lever as constant pressure thereagainst.

2. A tonometer as recited in claim 1 wherein said constant pressure energy storage means is adjustable in said slideway relative to said lever for varying the location of said energy transfer point on said lever and for producing a measuring pressure by which said applanating head is forced against said cornea, means for adjusting said energy storage means and for measuring said pressure comprising:
   a rack on said fixture;
   a shaft journaled in said main instrument body with at least one end thereof extending through said body, said shaft having a pinion gear thereon meshing with said rack and fixed to said shaft for rotation therewith; and
   an operating knob on said one end of said shaft including a pressure measuring dial.

3. A tonometer as recited in claim 1 further comprising means on said fixture for regulating and setting the tension of said spring.

4. A tonometer as recited in claim 1 wherein said work arm is detachable from said trunnion and includes an adaptor at its proximal end having a longitudinally slotted anchor pin, said trunnion having an opening therein for receiving said pin and a detent adapted to resiliently engage in said longitudinal slot when said work arm is rotated about said pin to a given direction while in said trunnion.

References Cited

UNITED STATES PATENTS 3,070,997   1/1963   Papritz et al. _____ 73—80

FOREIGN PATENTS 1,292,152   4/1962   France.

RICHARD C. QUEISSER, Primary Examiner
JOHN K. LUNSFORD, Assistant Examiner